US012662855B2

(12) United States Patent
Knechtel et al.

(10) Patent No.: US 12,662,855 B2
(45) Date of Patent: Jun. 23, 2026

(54) SECURING ARRANGEMENT FOR A FLAP OR COVER OF A VEHICLE

(71) Applicant: Bayerische Motoren Werke Aktiengesellschaft, Munich (DE)

(72) Inventors: Marcus Knechtel, Kirchheim (DE); Arne Koehler, Pliening (DE); Ulrich Koestler, Hebertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 25 days.

(21) Appl. No.: 18/294,376

(22) PCT Filed: Aug. 24, 2022

(86) PCT No.: PCT/EP2022/073532
§ 371 (c)(1),
(2) Date: Feb. 1, 2024

(87) PCT Pub. No.: WO2023/030982
PCT Pub. Date: Mar. 9, 2023

(65) Prior Publication Data

US 2024/0263493 A1 Aug. 8, 2024

(30) Foreign Application Priority Data

Sep. 3, 2021 (DE) ..................... 10 2021 122 830.1

(51) Int. Cl.
*E05B 83/24* (2014.01)
*E05B 63/14* (2006.01)
(Continued)

(52) U.S. Cl.
CPC ............ *E05B 83/24* (2013.01); *E05B 63/143* (2013.01); *E05B 79/20* (2013.01); *E05B 81/06* (2013.01); *E05B 81/08* (2013.01); *E05B 81/16* (2013.01)

(58) Field of Classification Search
CPC .......... E05B 83/16; E05B 83/18; E05B 83/24; E05B 83/243; E05B 83/247; E05B 81/25; E05B 81/46; E05B 79/20
See application file for complete search history.

(56) References Cited

U.S. PATENT DOCUMENTS 3,026,132 A * 3/1962 Korab .................... E05B 83/247
292/DIG. 14
4,346,925 A 8/1982 Okada
(Continued)

FOREIGN PATENT DOCUMENTS

DE 1 031 151 B 5/1958
DE 30 25 261 A1 1/1981
(Continued)

OTHER PUBLICATIONS

International Search Report (PCT/ISA/210) issued in PCT Application No. PCT/EP2022/073532 dated Dec. 14, 2022 with English translation (5 pages).
(Continued)

*Primary Examiner* — Kristina R Fulton
*Assistant Examiner* — Noah Horowitz
(74) *Attorney, Agent, or Firm* — Crowell & Moring LLP

(57) ABSTRACT

A locking arrangement for a vehicle includes at least two locks for locking a flap or cover, in particular a single flap or cover, of the vehicle, and an opening device with an actuating device, in particular a single actuating device, for unlocking the two locks. The opening device is designed.

14 Claims, 5 Drawing Sheets

(51) Int. Cl.

| | |
|---|---|
| ***E05B 79/20*** | (2014.01) |
| ***E05B 81/06*** | (2014.01) |
| ***E05B 81/08*** | (2014.01) |
| ***E05B 81/16*** | (2014.01) |

(56) References Cited

U.S. PATENT DOCUMENTS

| | | | | |
|---|---|---|---|---|
| 4,691,584 | A | 9/1987 | Takaishi et al. | |
| 11,007,972 | B2 * | 5/2021 | Miller | E05B 83/24 |
| 11,066,853 | B2 * | 7/2021 | Ney | E05B 79/20 |
| 11,118,381 | B2 * | 9/2021 | Nelsen | E05B 79/20 |
| 11,384,573 | B2 * | 7/2022 | Sturm | E05B 47/0676 |
| 11,414,904 | B2 * | 8/2022 | Klein | E05B 85/245 |
| 11,486,168 | B2 * | 11/2022 | Oyama | E05B 79/20 |
| 11,801,900 | B2 * | 10/2023 | Gillis | E05B 77/54 |
| 11,821,243 | B2 * | 11/2023 | Lim | E05B 83/24 |
| 12,054,973 | B2 * | 8/2024 | Holbein | E05B 83/24 |
| 2018/0371807 | A1 | 12/2018 | Sturm et al. | |
| 2021/0237804 | A1 | 8/2021 | Gillis et al. | |
| 2021/0277689 | A1 * | 9/2021 | Sturm | E05B 85/243 |
| 2022/0162887 | A1 * | 5/2022 | Page | E05B 81/16 |
| 2025/0290356 | A1 * | 9/2025 | Cumbo | E05B 81/25 |

FOREIGN PATENT DOCUMENTS

| | | | |
|---|---|---|---|
| DE | 39 23 726 | A1 | 1/1991 |
| DE | 198 16 991 | A1 | 11/1999 |
| DE | 10 2005 023 224 | A1 | 11/2006 |
| DE | 10 2004 037 961 | B4 | 4/2008 |
| DE | 10 2007 008 796 | A1 | 8/2008 |
| DE | 10 2011 108 438 | A1 | 3/2012 |
| DE | 20 2014 102 567 | U1 | 10/2015 |
| DE | 10 2015 121 848 | A1 | 6/2017 |
| FR | 2 766 862 | A1 | 2/1999 |
| KR | 2002-0014921 | A | 2/2002 |

OTHER PUBLICATIONS

German-language Written Opinion (PCT/ISA/237) issued in PCT Application No. PCT/EP2022/073532 dated Dec. 14, 2022 with English translation (10 pages).

German-language Search Report issued in German Application No. 10 2021 122 830.1 dated May 27, 2022 with partial English translation (10 pages).

Chinese-language Office Action issued in Chinese Application No. 2022800446566 dated Oct. 22, 2025, with English translation (9 pages).

* cited by examiner

A - A

SECURING ARRANGEMENT FOR A FLAP OR COVER OF A VEHICLE

BACKGROUND AND SUMMARY

The invention relates to a locking arrangement for a vehicle. Locks for locking a flap of the vehicle can be activated by means of the locking arrangement. Furthermore, the invention relates to a vehicle having a flap and associated locking arrangement. The flap is in particular a front flap of the vehicle.

In the case of flaps in vehicles, it must always be ensured that they cannot be opened by unauthorized persons. Furthermore, the flaps should also not be able to be unintentionally opened during travel. In existing vehicles, either a two-time activation from the interior is required (on the first activation, a warning tone may sound) or an activation can be carried out from the interior and then on the flap another lock, in particular a catch hook, has to be opened (for example, standing in front of the vehicle) in order to open the flap. It is consequently ensured that during travel the flap also cannot be unintentionally opened. With front flaps, in the prior art, for example, combinations of locks and catch hooks are used, wherein, after unlocking the lock, the front flap is still secured with a catch hook which still has to be activated.

The object of the present invention is to provide a locking arrangement for a vehicle which, on the one hand, is comfortable to operate and, on the other hand, enables safe operation of the vehicle.

The object is achieved by the features of the independent claim. The dependent claims relate to advantageous embodiments of the invention.

The locking arrangement according to the invention for a vehicle has at least two locks for locking a flap, in particular a single flap, of the vehicle, and an opening apparatus having an activation apparatus, in particular a single activation apparatus, for unlocking or opening the locks. The opening apparatus is configured in such a manner that, with the activation apparatus, only a single lock can be opened with an activation of the activation apparatus in each case. In other words, using the activation apparatus the locks cannot be unlocked or opened at the same time. The locks may in particular not be unlocked or opened at the same time with a single activation of the activation apparatus.

When the hood is unlocked, when one of the two locks is unlocked, the other lock which is still locked thereby performs a catch hook function.

The locking arrangement is preferably configured without a separate catch hook. Both locks are further preferably configured without an integrated catch hook function or without an integrated catch hook. The locking arrangement accordingly has only two simple locks without any additional catch hook function.

In comparison with a locking arrangement with two locks and catch hooks, the locking arrangement according to the invention is consequently simpler, more lightweight and more cost-effective. In comparison with a locking arrangement having only one lock and an integrated or separate catch hook, the flap with two spaced-apart locks can be locked better and with less vibration.

An activation apparatus for each lock may also be provided, wherein a simultaneous activation of the activation apparatuses is prevented using appropriate means so that the activation apparatuses can be actuated only one after the other.

The locking arrangement according to the invention is configured for use on a vehicle. The vehicle is in particular two-track land vehicle.

The locking arrangement preferably comprises at least two locks for locking a flap of the vehicle. The flap is in particular a front flap (hood). The front flap is in particular used to cover an engine compartment, a battery compartment or other storage space. In the application in question here, the flap of the vehicle is locked with two locks which are spaced apart from each other.

The locking arrangement further comprises an opening apparatus for unlocking the two locks. The opening apparatus comprises an activation apparatus, in particular a single activation apparatus, for unlocking or opening the locks. The opening apparatus is configured in such a manner that with the activation apparatus only a single lock can be opened with one activation of the activation apparatus in each case. The activation apparatus is preferably in the form of a rotatably supported lever. Alternatively, the activation apparatus may also be arranged in a linearly movable manner and/or with another degree of freedom of movement. The activation apparatus is preferably connected to the locks in order to unlock the locks.

In addition, the opening apparatus preferably has a rotary lever. The rotary lever is configured and arranged for manual activation. In particular, the rotary lever is gripped and rotated by a person. The rotary lever is drivingly connected to the activation apparatus, in particular by means of an optional coupling.

Preferably, the opening apparatus comprises a switchable coupling. In the coupled state, the coupling connects the rotary lever to the activation apparatus directly or indirectly so as to transmit torque. In this coupled state, a rotational movement of the rotary lever leads to a movement of the activation apparatus. The movement of the activation apparatus in turn leads to unlocking the locks. In the uncoupled state of the coupling, no torque is transmitted from the rotary lever to the activation apparatus.

In particular, the activation apparatus is connected to the locks in such a manner that a movement, in particular rotation, of the activation apparatus in one direction of unlocks at least one of the locks; a movement, in particular rotational movement, of the activation apparatus in the opposing direction leads to the unlocking of at least one other lock. Accordingly, the rotary lever can preferably also be moved manually in both directions in order to thus unlock the locks in a two-stage operation. As a result of this two-stage movement of the rotary lever in two opposing directions to unlock the locks, it is ensured that there is no unintentional complete unlocking of the flap by unlocking the locks.

The locking arrangement with the rotary lever and the activation apparatus can be arranged in such a manner that the rotary lever is accessible from outside the vehicle. For example, the rotary lever can be gripped in the region of the radiator grille. Alternatively, the rotary lever may, for example, also be able to be gripped from the vehicle interior.

In order to prevent unauthorized unlocking, the switchable coupling is advantageous. As long as the coupling is in the uncoupled state, any unauthorized activation of the rotary lever leads to no force transmission or torque transmission to the activation apparatus. Consequently, the locks are not unlocked.

The locking arrangement preferably comprises a base on which the rotary lever and/or the activation apparatus are supported and where applicable also the coupling is mounted. This base may be an independent component which is intended to be secured to the body of the vehicle. Alternatively, the base may also be an integral component of the body or another component of the vehicle.

Furthermore, there is preferably provision for the rotary lever and/or the activation apparatus to be resiliently loaded and to be moved back into the starting position. by this resilient loading.

Preferably, there is provision for the coupling to have an electrically controllable actuator for switching the coupling. The actuator is, for example, an electric motor or an electromagnetically acting actuator. By means of this actuator, a pin can preferably be inserted and retracted. By means of this pin, a coupling of the rotary lever and the activation apparatus is carried out, as will be described in detail below.

Furthermore, there is preferably provision for the actuator to be able to be controlled by means of a central locking system of the vehicle. In this instance, there is in particular provision for the opening signal of the central locking, which is used, for example, to unlock the doors, to control the coupling for coupling. There is also preferably provision for the closure signal of the central locking system to control the coupling for uncoupling.

Additionally or alternatively to control via the central locking system, the coupling may also be controlled in another manner, for example, by means of a signal which can be activated in the vehicle interior by the driver and/or by means of a corresponding button on the radio key.

As described, the coupling preferably comprises a pin which can be extended. For example, the coupling is configured in a similar manner to the locking unit which can be controlled by means of the central locking system on a tank cover. On the tank cover, actuators which lock the tank cover by means of an extendable pin and which release the opening of the tank cover by retracting the pin are also used. A similar component can be used in the context of the present invention for the coupling. The extendable pin of the coupling moves during uncoupling into a recess of the rotary lever and/or into a recess of the activation apparatus. If, for example, the coupling is arranged on the rotary lever, the pin can be inserted into and retracted from a recess of the activation apparatus in order to thus couple and uncouple. The coupling may also be arranged on the activation apparatus, wherein the pin in order to couple and uncouple is then inserted into and retracted from the recess of the rotary lever. According to a third variant, the coupling can be arranged independently of the rotary lever and activation apparatus and can be introduced during coupling through coaxial recesses of the rotary lever and the activation apparatus and can be retracted again from both of the recesses for uncoupling.

The activation apparatus is preferably connected, by way of two opposing force transfer devices, to the locks, in particular the two locks. The force transfer devices are, for example, Bowden cables. From the activation apparatus a first force transfer device consequently preferably extends to the first lock and a second force transfer device preferably extends to the second lock. The locks are preferably configured in each case in such a manner that, by pulling on the force transfer devices, the locks become unlocked or open and remain in the unlocked state until the flap is opened and closed again. The locks engage in their locked state again only by closing the flap.

The two force transfer devices extend from the activation apparatus in opposing directions to the respective lock. It is thereby possible, by moving, in particular rotationally moving, the activation apparatus in one direction, for only one force transfer device to be pulled and consequently only one lock to be unlocked. Only by moving, in particular rotationally moving, the activation apparatus in the opposing direction is the tensile force transmitted via the second force transfer device to the second lock.

The securing of the two force transfer devices to the securing apparatus is preferably configured in such a manner that no thrust (also: pressure) can be transmitted to the force transfer devices. This is particularly achieved by the activation apparatus having a receiving groove. The heads of the two force transfer devices are located in this receiving groove. When the heads bear on the end of the receiving groove, a traction force can be transmitted to the respective force transfer device. In an opposing movement direction, the head of the force transfer device slides in the receiving groove so that no thrust can be transmitted.

The two rotation axes of the activation apparatus and rotary lever are preferably arranged in a coaxial manner. In particular, there is provided a common shaft on which the activation apparatus and the rotary lever are supported.

An extendable extension lever is preferably located on the rotary lever. The extension lever is preferably resiliently loaded so that it returns again to the starting position. This extendable extension lever can be pulled out manually by the operator so that the lever length increases, whereby less force is required to activate the mechanism. In particular, the locking arrangement is located in the front region of the vehicle, for example, in the region of the radiator grille. Accordingly, the extension lever can be pulled forward out of the vehicle.

The invention further comprises a vehicle with a flap. The flap is in particular a front flap of the vehicle. The vehicle further comprises a locking arrangement, as described above. Preferably, there is provision for the coupling of the locking arrangement to be able to be switched by means of the central locking system of the vehicle.

Other details, features and advantages of the invention will be appreciated from the following description and the figures.

DETAILED DESCRIPTION OF THE DRAWINGS

Figure 1:
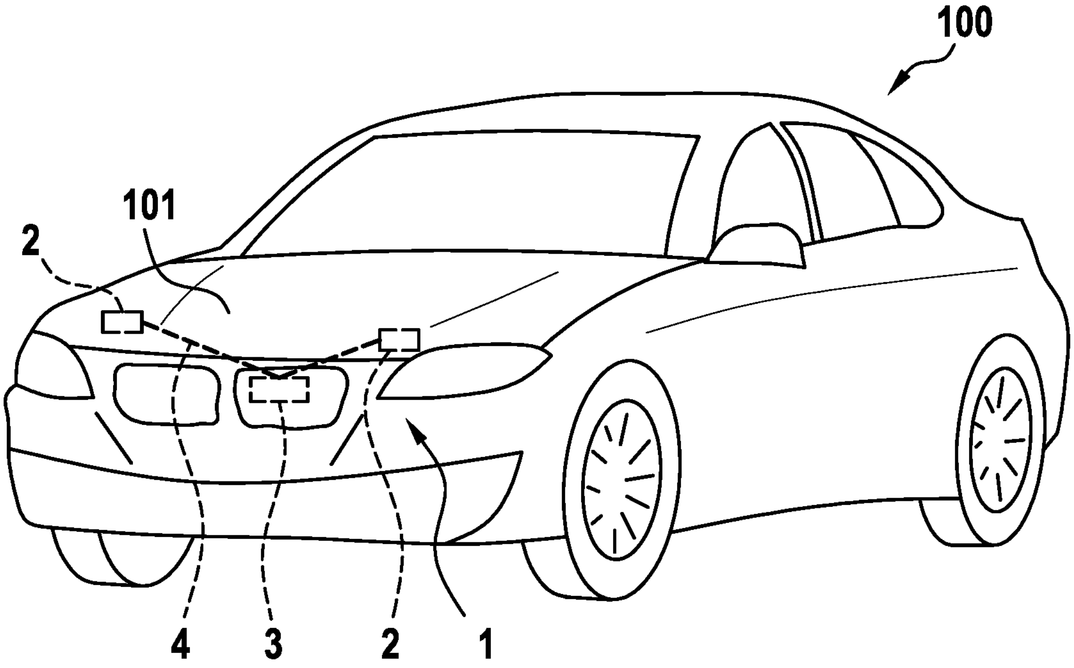
FIG. 1 shows a vehicle with a locking arrangement according to an exemplary embodiment of the invention.

FIG. 1 shows a vehicle 100 having a flap 101. The flap 101 is the front flap (hood) of the vehicle 100.

The vehicle 1 comprises a locking arrangement 1 according to the exemplary embodiment shown here. The locking arrangement 1 comprises two locks 2 which are spaced apart from each other for locking the flap 101. The locking arrangement 1 further comprises an opening apparatus 3 which is connected to the two locks by way of two force transfer devices 4.

Figure 2:
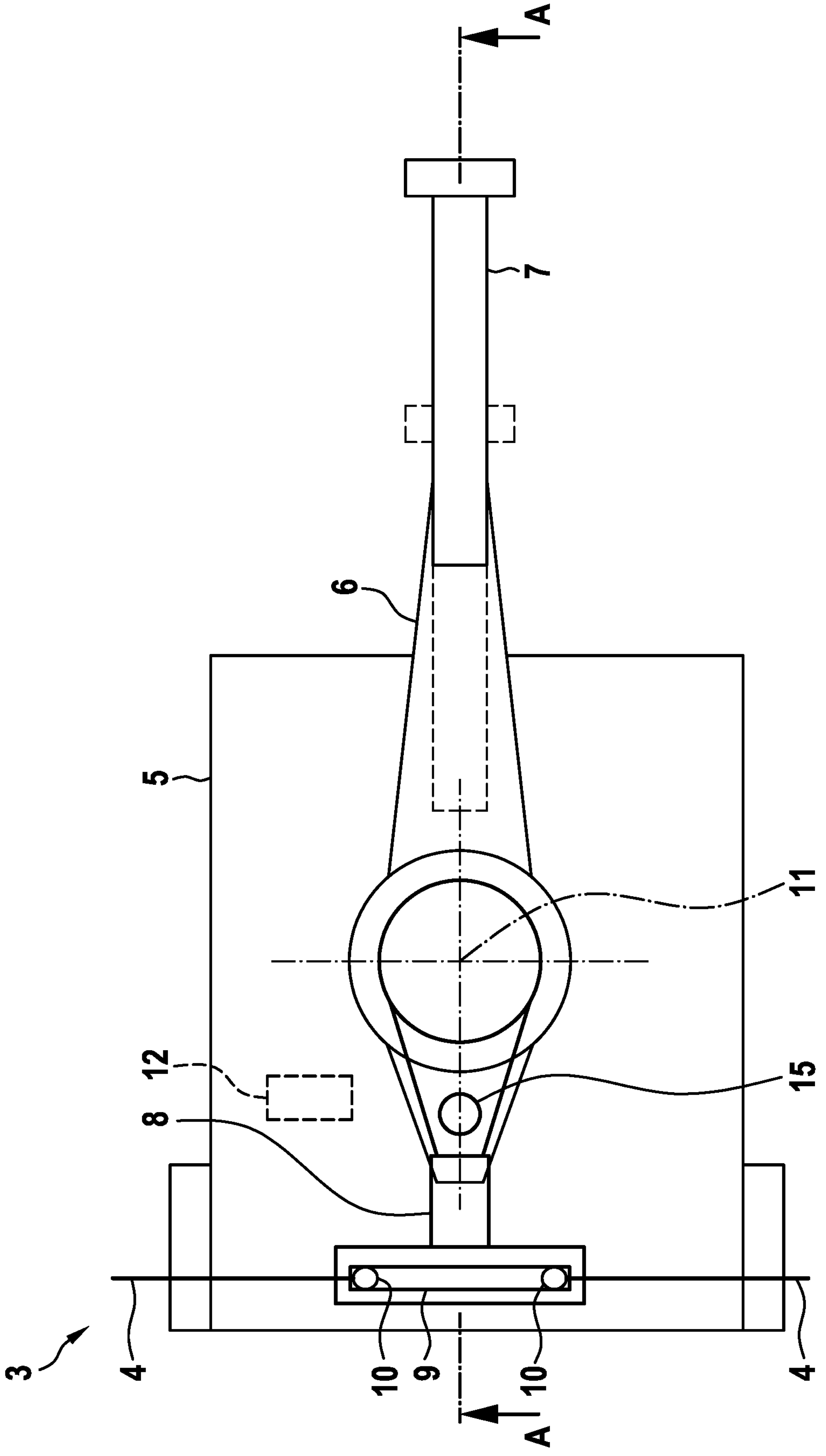
FIG. 2 is a schematic view of the locking arrangement according to the exemplary embodiment in a basic position.
Figure 3:
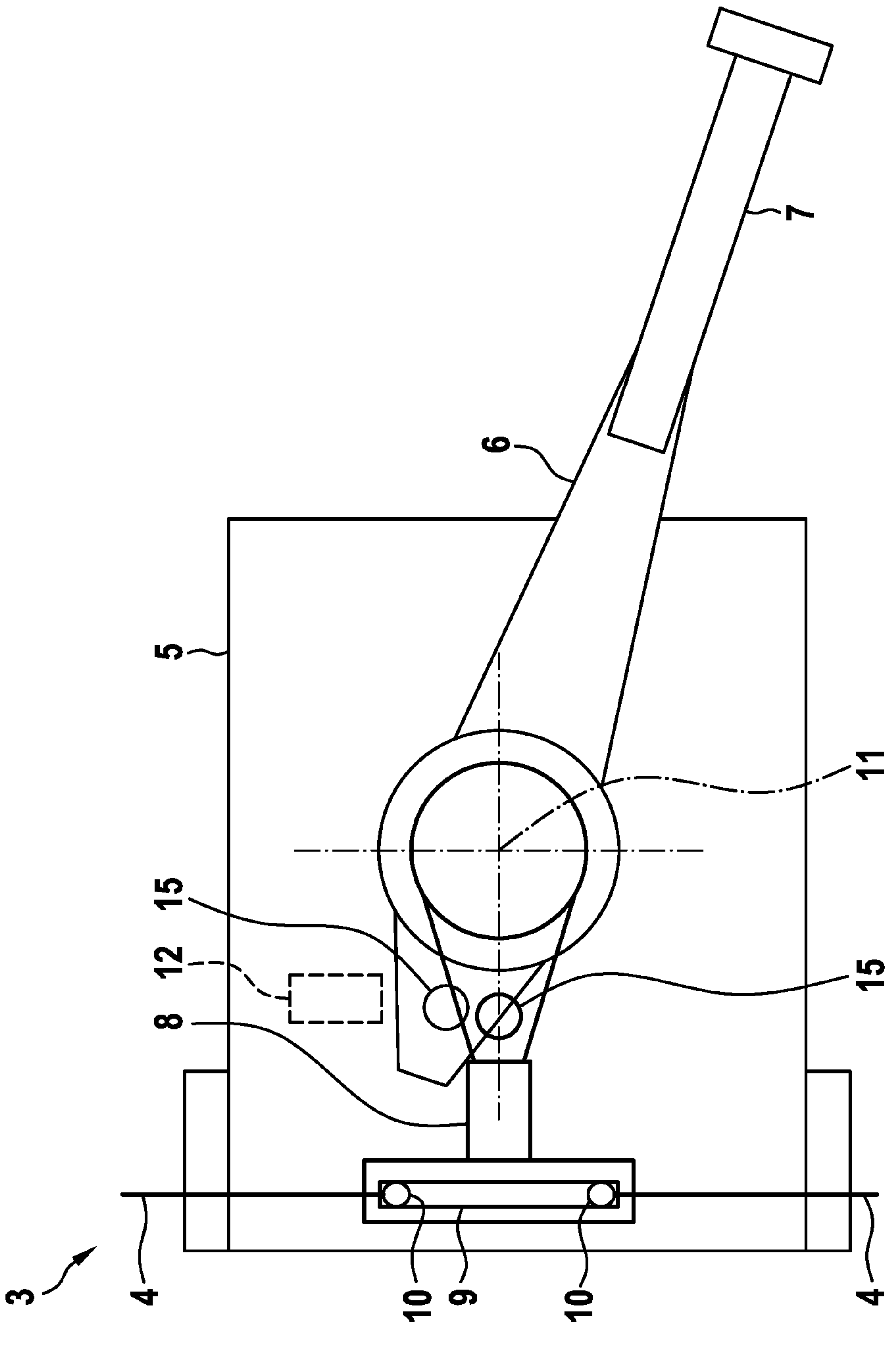
FIG. 3 is a schematic view of the locking arrangement according to the exemplary embodiment in the uncoupled state.
Figure 4:
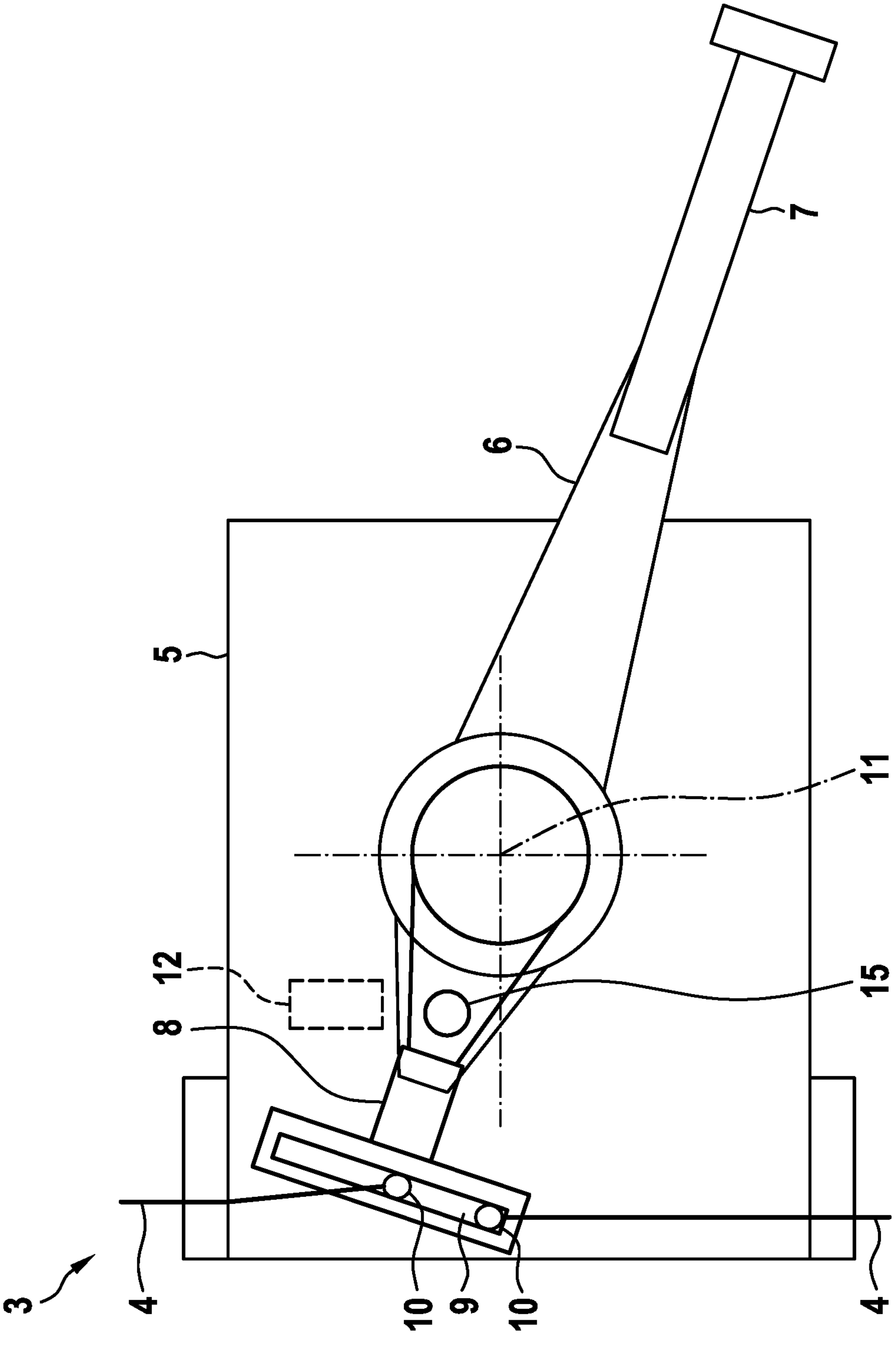
FIG. 4 is a schematic view of the locking arrangement according to the exemplary embodiment in the uncoupled state.
Figure 5:
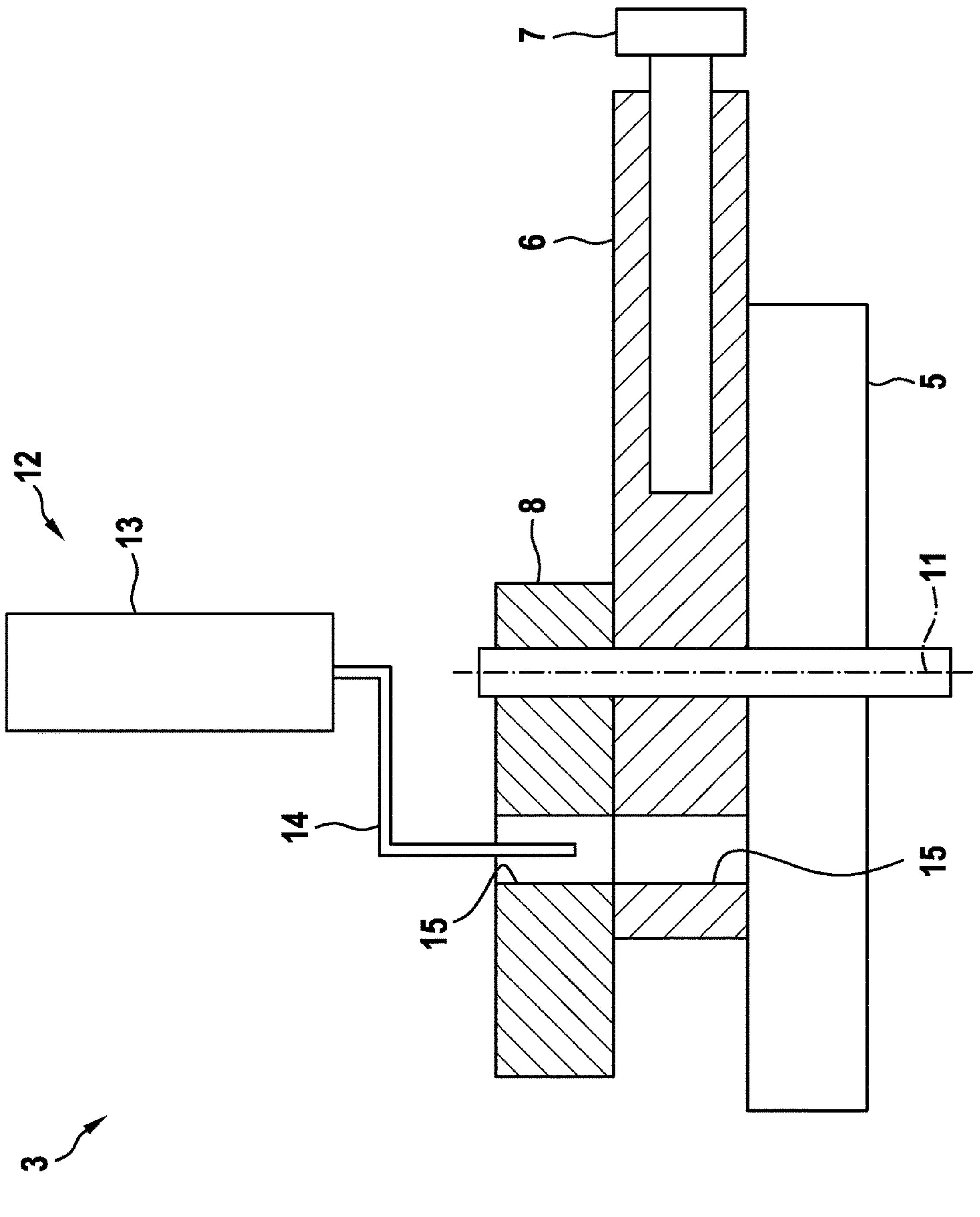
FIG. 5 is a schematic illustration of the section designated A-A in FIG. 2.

FIGS. 2 to 5 show, as schematic illustrations, the locking arrangement 1. Unless stated otherwise, reference is always made to FIGS. 2 to 5 below. FIG. 2 shows in this instance the locking arrangement 1 in a basic position. FIG. 3 shows the locking arrangement 1 in an activated but uncoupled state—without activation of the lock. FIG. 4 shows the locking arrangement 1 in an activated, coupled state, wherein one of the locks has been activated. FIG. 5 shows the section designated A-A in FIG. 2.

The locking arrangement 1 comprises a base 5. The base 5 is mounted in the body of the vehicle 100 or is an integral component of the body. On the base 5 there is a rotary lever 6 which is supported in a rotationally movable manner about a rotation axis 11. From the rotary lever 6, an extension lever 7 may be retracted in order to increase the lever length and consequently to reduce the operating force. It is not illustrated that the extension lever 7 may be able to be reset in a resiliently loaded manner.

There is further located on the base 5 an activation apparatus 8 in the form of a rotatably supported lever. The activation apparatus 8 is also rotatably supported about the rotation axis 11.

The activation apparatus 8 has a receiving groove 9. This receiving groove 9 extends in a direction perpendicular to the rotation axis 11. The receiving groove 9 may alternatively also be circular. Force transfer device heads 10 of the two force transfer devices 4 are located in the receiving groove 9. From the activation apparatus 8 or from the receiving groove 9, the two force transfer devices 4 extend in opposite directions to the two locks 2 illustrated in FIG. 1.

Furthermore, the Figures show a coupling 12, the function of which is schematically illustrated in FIG. 5. Accordingly, the rotary lever 6 and the activation apparatus 8 each have a recess 15. In the basic position according to FIG. 2, the two recesses 15 are congruent. The coupling 12 has an actuator 13 which can be controlled. For example, the actuator 13 is an electric motor or an electromagnetic actuator. The coupling 12 comprises a pin 14 which can be inserted and retracted by means of the actuator 13. When the pin 14 protrudes through both recesses 15, the rotary lever 6 and the activation apparatus 8 are coupled to each other; a rotational movement of the rotary lever 6 leads to a rotational movement of the activation apparatus 8. When the pin 14 is retracted and in this instance moves at least out of the recess 15 of the rotary lever 6, the rotary lever 6 and the activation apparatus 8 are uncoupled and a rotational movement cannot be transmitted. The actuator 13 is secured to the base 5 and the pin 14 also moves through the offset arrangement always with the activation apparatus 8; or in the coupled state with respect to the rotary lever 6 and the activation apparatus 8.

In the schematic illustration according to FIG. 5, the coupling 12 is located on the activation apparatus 8. However, any other arrangement of the coupling is also possible, as explained in the general portion of the description.

In the illustration according to FIG. 3, the coupling 12 is uncoupled. A movement of the rotary lever 6 consequently leads to no movement of the activation apparatus 8 and consequently to no force transmission via the force transfer devices 4 to the two locks. The two locks 2 thereby remain in the locked state.

FIG. 4 explains the coupled state. A rotational movement of the rotary lever 6 leads in this instance to a rotational movement of the activation apparatus 8. During the rotation illustrated in FIG. 4, the force transfer devices 4 illustrated at the bottom in the Figure is subjected to tension. The head 10 of the upper force transfer devices 4 slides in the receiving groove 9 so that no thrust or pressure is transmitted to this force transfer devices 4. In order to open the second lock 2, the rotary lever 6 is moved in the opposite direction so that the activation apparatus 8 is moved downward with respect to the illustration in FIG. 4 and consequently the upper force transfer device 4 is also pulled. The return springs which independently move the rotary lever 6 and the activation apparatus 8 back into the starting position thereof are not illustrated. Such resettings are, for example, known in vehicle door locking cylinders, where the key can be removed only in one position, and are not explained in greater detail here. Consequently, it is ensured that the rotary lever 6 and the activation apparatus 8 always maintain the correct position with respect to each other when the rotary lever 6 is not activated and consequently the pin 14 can couple when the actuator 13 is activated.

The exemplary embodiment shows schematically two coaxially supported elements, that is to say, the rotary lever 6 and the activation apparatus 8 which can be connected to each other by means of a coupling 12 having a pin 14. In the context of the invention, however, there is not necessarily provision for the rotary lever 6 and the activation apparatus 8 to be supported coaxially. The transmission of the torque from the rotary lever 6 to the activation apparatus 8 also does not have be carried out directly via the coupling 12 or the pin 14. Other components may also be arranged between the rotary lever 6 and the activation apparatus 8 so that the torque can be transmitted via these additional components indirectly to the activation apparatus 8.

One of the two locks 2 (or both locks 2) may have a sensor for interrogating the locking state. This at least one sensor is connected to a control device of the vehicle so that the locking state of the lock or the two locks in the vehicle can be indicated and/or used in another manner.

With the invention shown here, the front flap can be unlocked from the interior (for example, by means of a switch) and then opened from the outside. Furthermore, the front flap can be opened when the vehicle is unlocked and can be unlocked via the remote-control system when the vehicle is locked. When the vehicle is locked, everything is always locked—including the front flap (anti-theft security).

Furthermore, regulations with regard to storage space can be complied with; when the space below the front flap is used as "other storage space" (for example, with vehicles having a rear engine or small electric motor or hub motors, etc.), by directly fitting an activation means which can be activated only from the storage space to the activation apparatus 8 (similar use to use in tailgates) it becomes possible for the locking arrangement to be able to be opened from the storage space.

LIST OF REFERENCE NUMERALS

- 1 Locking arrangement
- 2 Locks
- 3 Opening apparatus
- 4 Force transfer device
- 5 Base
- 6 Rotary lever
- 7 Extension lever
- 8 Activation apparatus
- 9 Receiving groove
- 10 Force transfer heads
- 11 Rotation axis
- 12 Coupling
- 13 Actuator
- 14 Pin
- 15 Recesses
- 100 Vehicle
- 101 Flap

What is claimed is:

1. A locking arrangement for a vehicle, comprising:

at least two locks for locking a flap of the vehicle;

an opening apparatus having an activation apparatus for unlocking the at least two locks, wherein the opening apparatus is configured such that the activation apparatus opens just a single one of the at least two locks, by a respective actuation of the activation apparatus, and the activation apparatus is a single rotatable lever mechanically connected to the at least two locks via two opposing force-transfer devices, such that rotation in a first direction unlocks only a first lock and rotation in an opposite direction unlocks only a second lock.

2. The locking arrangement according to claim 1, wherein the activation apparatus is in the form of a rotatably supported lever which is connected to the at least two locks in order to unlock the at least two locks.

3. The locking arrangement according to claim 1, wherein the opening apparatus comprises a rotary lever and a coupling, the rotary lever is configured and arranged for manual activation, and the coupling is switchable, and in the coupled state connects the rotary lever to the activation apparatus so as to transmit torque and in the uncoupled state transmits no torque from the rotary lever to the activation apparatus.

4. The locking arrangement according to claim 3, wherein the coupling has an electrically controllable actuator for switching the coupling.

5. The locking arrangement according to claim 1, wherein the electrically controllable actuator is controlled via a central locking system of the vehicle.

6. The locking arrangement according to claim 3, wherein the coupling comprises a pin which is extendable and which, for coupling, is introduced into a recess of the rotary lever and/or into a recess of the activation apparatus.

7. The locking arrangement according to claim 1, wherein the activation apparatus is connected to the two locks by way of two opposing force transfer devices.

8. The locking arrangement according to claim 7, wherein the force transfer devices are displaceably received in the activation apparatus so that no thrust can be transmitted to the force transfer devices.

9. The locking arrangement according to claim 3, wherein the rotation axes of the rotary lever and the activation apparatus are coaxial.

10. The locking arrangement according to claim 1, wherein an extendable extension lever is arranged on a rotary lever.

11. The locking arrangement according to claim 1, wherein the locking arrangement is for only a single flap, and the opening apparatus has only a single activation apparatus.

12. A vehicle, comprising:

a flap; and a locking arrangement according to claim 1.

13. The vehicle according to claim 12, wherein the flap is a front flap.

14. The vehicle according to claim 12, wherein a coupling is switched by a central locking system of the vehicle.

* * * * *